C. BENEFIEL.
CHAIN SAW.
APPLICATION FILED SEPT. 10, 1919.
1,339,091.
Patented May 4, 1920.
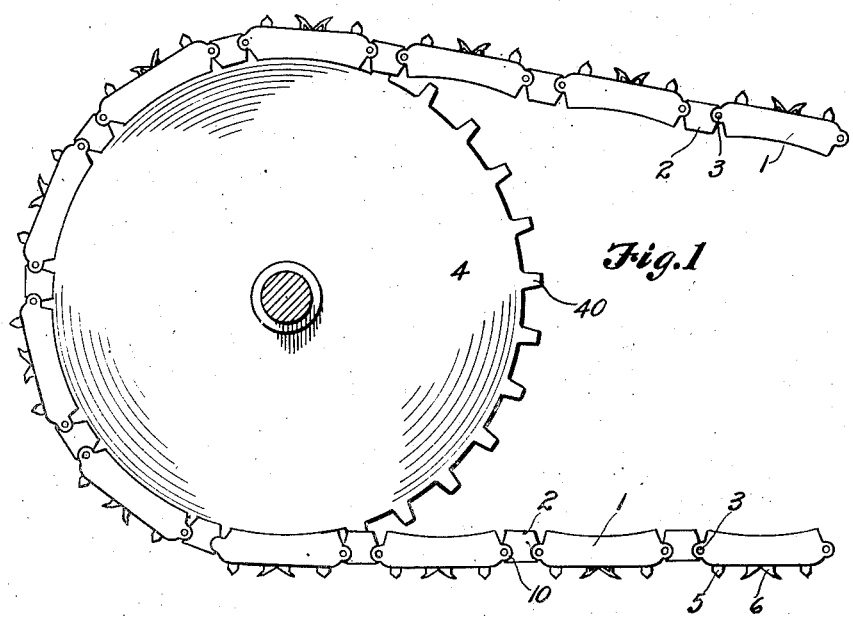
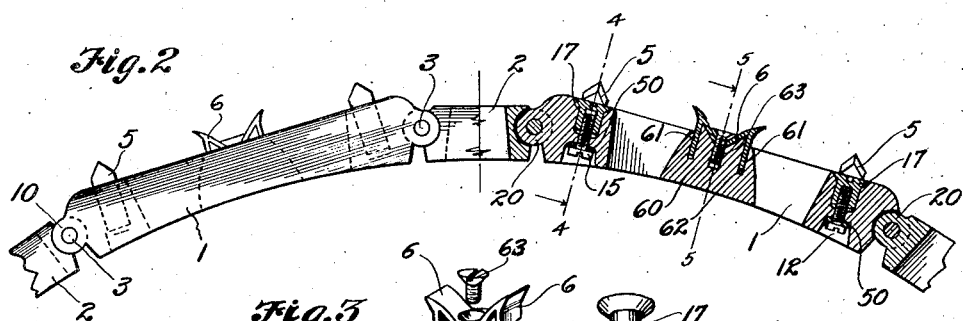
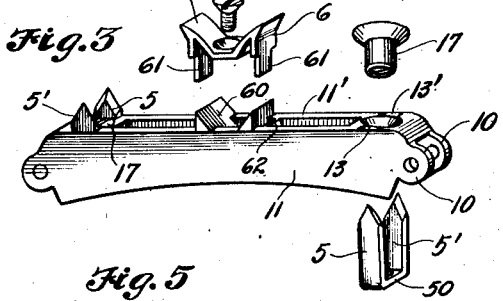
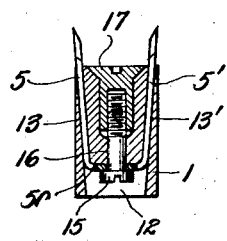
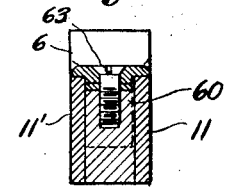
Inventor
CLAUDE BENEFIEL
By Reynolds & Cook,
Attorney

UNITED STATES PATENT OFFICE.

CLAUDE BENEFIEL, OF BREMERTON, WASHINGTON, ASSIGNOR OF ONE-HALF TO WILLIAM A. CLENCH, OF SEATTLE, WASHINGTON.

CHAIN SAW.

1,339,091.  Specification of Letters Patent.  Patented May 4, 1920.

Application filed September 10, 1919. Serial No. 322,932.

*To all whom it may concern:*

Be it known that I, CLAUDE BENEFIEL, a citizen of the United States, and resident of the city of Bremerton, in the county of Kitsap and State of Washington, have invented certain new and useful Improvements in Chain Saws, of which the following is a specification.

My invention relates to chain saws and more particularly to that class of saws wherein a chain belt, equipped with cutting and drag teeth is adapted to travel upon sprocket wheels and is power driven.

The principal object of the invention is to provide a chain saw of this character comprising links equipped with cutting and cleaning teeth of novel construction which may be readily removed, when worn or dulled to permit their being sharpened or replaced.

In accomplishing this and other objects of the invention I have provided improved details of construction, the preferred forms of which are illustrated in the accompanying drawings, wherein—

Figure 1 is a side view of a chain saw embodying the present invention.

Fig. 2 is an enlarged view of a part of the chain, some of the links being shown in longitudinal section to better illustrate the manner of removably mounting the saw teeth.

Fig. 3 is a detail perspective view of a working link, parts thereof being removed and shown in disassembled relation.

Fig. 4 is a transverse section taken on the line 4—4 in Fig. 2, particularly illustrating the mounting of a member forming a pair of cutting teeth.

Fig. 5 is a similar view on the line 5—5 illustrating the manner of securing a drag tooth in a link.

Referring more in detail to the drawings—

The chain saw in its preferred form of construction comprises a series of alternately arranged working links 1 and relatively short idler links 2, which are joined together to form a continuous chain belt; the connection being made by pivot pins 3 extended through complementally placed eyes at the ends of the links, which links are constructed to receive the sprocket teeth 40 of a driving wheel 4, as illustrated in Fig. 1.

Each of the longer, or working links 1, is provided at its ends with spaced wings 10, between which complemental lugs 20 of the adjacent links are projected and pivotally connected by the pins 3. The sides 11—11' of the links are spaced sufficiently apart to receive the sprockets of the driving wheel; the shorter links being adapted to receive but one sprocket while the longer links receive two.

At the inner side of each of the working links and at each end thereof, is a socket 12 and leading from the bases of said sockets to the opposite edges of the links at the sides opposite the sockets, are outwardly diverging channels 13—13' adapted to receive the paired teeth 5—5'.

Each pair of teeth comprise the sides of a U-shaped member 50, which is adapted to seat within a socket 12, as shown particularly in Fig. 4, with the base of the U member against the base of the socket and each tooth-forming member is removably secured in this manner by bolts 15, which are extended through the bases of the U-members into bores 16 in the link body and at their ends thread into cap screws 17, which are seated in shouldered sockets 18 which open to the opposite sides of the links.

The ends of the teeth 5—5' project a desirable distance beyond the side faces of the link and are sharpened to points to form the cutting members of the chain. As the teeth are set in an outwardly diverging manner, the ends extend slightly beyond the sides of the links to give the saw a set that will facilitate cutting and operation.

Located centrally between the ends of each of the longer links, is a double edged drag or raker tooth 6. These teeth are mounted on blocks 60 which are preferably welded between the sides of the links and are of such a nature as to afford engagement with a driving sprocket.

Each of the drag teeth 6 comprises an M shaped member which is mounted on a block 60 with the legs 61, which form the sides of the M, seated in sockets 62 in the block and secured in this manner by a screw 63 which projects through the central part of the M and is threaded into the block. The surface of the block conforms to the surface of the tooth, so that a substantial mounting is provided. The edges of the teeth, which correspond to the upper points of the M, extend entirely across the links and are sharpened so that they will effectively clean out the material or wood between the cuts made by the paired cutting teeth.

Assuming that the chain is so constructed, it will be seen that by removing the screws 63 and bolts 15, the cutting and drag teeth may easily and quickly be removed and replaced should it become necessary.

It is also apparent that a chain so constructed would be substantial and efficient and could be operated effectively in either direction.

What I claim as my invention is:

1. In a chain saw, a link having two channels leading upward from its under face to its upper face, a U-shaped tooth having its side members extending outward through said channels beyond the upper face of the link to form cutting teeth, and means for removably securing said tooth in the link.

2. In a chain saw, a link having two upwardly diverging channels leading from its under face to its upper face, a U-shaped tooth having its side members extending outward through said channels beyond the upper face of the link, and flared outward beyond the side faces of the link to form cutting teeth, and means for removably securing said tooth in the link.

3. In a chain saw, a link having a socket in its under face and having diverging channels leading from the base of said socket to the opposite face of said link, a U-shaped tooth seated in said socket with the side members thereof extending outwardly through said channels and beyond the outer face of the link, and being sharpened at their ends to form cutting teeth, and means for removably securing said U-shaped tooth in said socket.

4. In a chain saw, a working link having sockets at its opposite ends opening to the inner face thereof, and spaced, outwardly diverging channels leading from the bases of said sockets, U shaped teeth having their sides seated in said sockets with the ends thereof extending to project from the outer face of the link and sharpened to form teeth, whereby parallel cuts may be made, a cleaning tooth mounted intermediate the ends of the link having cutting edges extending transversely with respect to the link and adapted to remove material loosened between the cutting teeth, and means for removably securing the teeth in functional position.

5. In a chain saw, a working link having a socket in its under face, and having spaced, outwardly diverging channels leading from the base of said socket to the opposite face of the link and adjacent the edges thereof, a U-shaped tooth seated in said socket with its side bars extending through said channels beyond the outer face of said link and sharpened to form cutting teeth, and a removable bolt extending through the base of said U-member and anchored within said link to retain the tooth in functional position.

6. In a chain saw, a working link having a socket in its under face, and having spaced, outwardly diverging channels leading from the base of said socket to the opposite face of the link and emerging adjacent the edges thereof, a U-shaped tooth seated in said socket with its sides extending through said channels beyond the outer face of said link and sharpened to form cutting teeth, a bolt seated within the socket and extending through the base portion of said tooth, and an anchor member threaded on to the bolt from the outer face of the tooth to removably secure the bolt and tooth in functional position.

7. In a chain saw comprising links connected in an endless series and adapted to operate over a sprocket wheel, a working link having sockets at its opposite ends opening to the inner face thereof, and spaced, outwardly diverging channels leading from the bases of said sockets to the opposite face of said link, a U-shaped tooth-forming member seated in each of said sockets with the sides thereof extending outwardly through said channels beyond the outer face of the link and sharpened at their ends, whereby parallel cuts may be made, a clearer tooth mounted intermediate the ends of the link, bolts inclosed within the end sockets, and extending through the bases of the U-shaped members and anchored within the link body to removably secure the cutting teeth in functional position, and a screw extending through the cleaning tooth whereby the same is removably secured in its mounting.

8. A saw having U-shaped teeth and a body provided with sockets for receiving the shanks of said teeth.

9. A saw having U-shaped teeth, a saw body provided with seats for the side bars of the teeth, and securing screws passing through the base of the teeth into the saw body.

10. A removable clearer tooth for saws having an M-shaped outline, a saw body socketed to receive the legs of said tooth, and means for securing said tooth in the saw body.

11. A removable tooth for saws having an M-shaped outline, a saw body socketed to receive the legs of said tooth and a securing member passing through the central part of the tooth.

12. A removable clearer tooth for saws having an M-shaped outline, a saw body socketed to receive the legs of said tooth and having ridges adapted to fit within the side angles of the tooth, and means for securing said tooth to the saw body.

13. A saw having U-shaped tooth holding sockets with opposite arms slightly diverging and opening substantially at the edge of the saw, and means for holding the teeth in the sockets.

14. A saw having U-shaped tooth holding sockets with opposite arms slightly diverging and opening substantially at the edge of the saw, and a securing screw passing through the bottom bar which connects said arms and into the saw body.

15. A chain saw composed alternately of long links and short links, each of said links being provided with sprocket tooth receiving recesses, and cutting and clearing teeth carried by the long links.

16. In a chain saw, a working link provided at its ends with paired sockets extending therethrough and a bolt hole between said sockets, and having a pair of sockets extending transversely of the link upon its upper side between said paired sockets, said link being engageable with a sprocket wheel.

Signed at Seattle, Washington, U. S. A. this 3rd day of September, 1919.

CLAUDE BENEFIEL.